United States Patent [19]

Wakabayashi et al.

[11] 4,289,388
[45] Sep. 15, 1981

[54] AUTOMATIC FOCUS ADJUSTING DEVICE OF A CAMERA HAVING A SELF-TIMER

[75] Inventors: Hiroshi Wakabayashi, Yokohama; Yoshiaki Ohtsubo, Kawasaki, both of Japan

[73] Assignee: Nippon Kogaku K.K., Tokyo, Japan

[21] Appl. No.: 190,408

[22] Filed: Sep. 24, 1980

[30] Foreign Application Priority Data

Sep. 29, 1979 [JP] Japan .................................. 54/124707

[51] Int. Cl.³ .......................... G03B 3/00; G03B 17/40
[52] U.S. Cl. ....................................... 354/25; 354/238
[58] Field of Search ................... 354/25, 195, 237, 238

[56] References Cited

U.S. PATENT DOCUMENTS 4,183,643  1/1980  Imura et al. ........................... 354/25
4,187,017  2/1980  Watanabe ........................ 354/238 X Primary Examiner—Michael L. Gellner
Attorney, Agent, or Firm—Fitzpatrick, Cella, Harper & Scinto

[57] ABSTRACT

In an automatic focus adjusting device for a camera including range finder means responsive to a release operation to detect the distance to an object lying at a position corresponding to a specific area of the phototaking picture plane, and means for driving a phototaking lens so as to be focused to the distance detected by the range finder means, said camera further including timer means and being capable of effecting the release operation in response to the operation of the timer means, limit means is provided which is operable in response to the timer means to limit the amount of movement of the phototaking lens driven by said driving means so that when the distance detected by the range finder means exceeds a predetermined distance, the phototaking lens is focused to the predetermined distance.

6 Claims, 4 Drawing Figures

AUTOMATIC FOCUS ADJUSTING DEVICE OF A CAMERA HAVING A SELF-TIMER

BACKGROUND OF THE INVENTION

1. Field of the Invention

This invention relates to an automatic focus adjusting device for a camera.

2. Description of the Prior Art

In the automatic focus adjusting device of a camera, the focusing area with respect to an object image is usually restricted to a portion of the center of the phototaking picture plane. That is, the detection range of light-receiving elements for detecting the definition of an object image is set to the range of the order of the light-receiving angle 8° of a portion of the phototaking picture plane. It is seen that this detection range is considerably narrow when compared with the fact that the angle of view of a standard lens is about 45° and that the angle of view of a wide angle lens is greater than that of a standard lens.

Were photography is effected by a camera having such an automatic focus adjusting device and by using a self-timer device, even if the photographer causes the self-timer of the camera to start and tries to photograph himself while standing in front of the background, the focus adjustment to the person cannot be accomplished but the automatic focus adjusting device would be focused to the background unless the photographer stands exactly within the above-described narrow detection range. Also, where two persons as an object are to be photographed by the use of a self-timer, there is a possibility that the focus adjustment is effected with respect to the background seen between the two persons, because the detection range exists at the center of the picture plane.

SUMMARY OF THE INVENTION

It is an object of the present invention to provide a camera provided with an automatic focus adjusting device which prevents out-of-focus photographs from being taken during photography using a self-timer.

To achieve the above object, the present invention provides, in an automatic focus adjusting device for a camera having a range finder device responsive to a release operation to detect the distance to an object and wherein a phototaking lens is driven so as to be focused to the detected distance, means for limiting the amount of movement of the phototaking lens so that the phototaking lens is focused to a predetermined distance when said detected distance exceeds a fixed distance.

Said fixed distance and said predetermined distance may be the same or may be more or less different. Also, said limit means may be constructed so as to compare the distance detected by the range finder device with said fixed distance and to be operated when the detected object distance exceeds said fixed distance, or may be constructed so as to be operated where the presence of an object cannot be detected when the range finder device has scanned to said fixed distance from a short distance toward infinity.

The invention will become more fully apparent from the following detailed description thereof taken in conjunction with the accompanying drawings.

DESCRIPTION OF THE PREFERRED EMBODIMENTS

Figure 1:
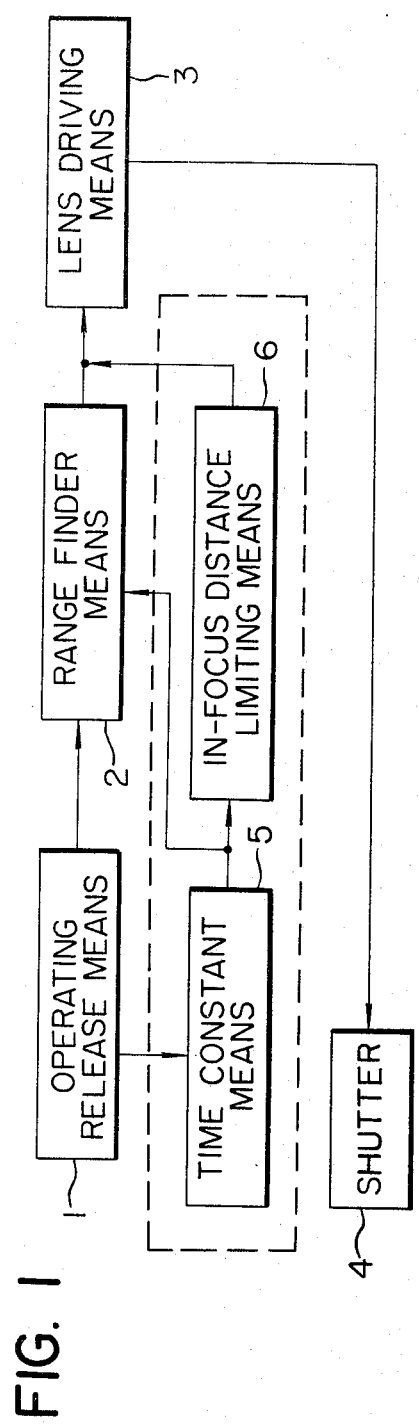
FIG. 1 is a block diagram illustrating the principle of the present invention.

The principle of the present invention will hereinafter be described by reference to FIG. 1. In the case of normal photography not using a self-timer, a mechanism for ordinary automatic focus photography is constructed in which, by operating release means 1 including a shutter release button, range finger means 2 including light-receiving elements is operated and the focusing lens of a phototaking lens is moved by lens driving means 3 to complete the focus adjustment with respect to an object, whereafter a shutter 4 is moved. When a self-timer is used, a mechanism shown within a broken line is further used. By operation of the release means 1, time constant means 5 for the self-timer starts to operate and after a predetermined time has elapsed, automatic focus detection and lens position adjustment are effected and simultaneously therewith, in-focus distance limiting means 6 operates. This in-focus distance limiting means 6 is a means which is for the first time incorporated in the series of operations of the automatic focus photographing mechanism by selecting the time constant means 5, and prevents the phototaking lens from forming its focus at a point beyond a predetermined distance. Accordingly, if this predetermined distance is suitably selected, during the photography using the self-timer, the focus adjustment with respect to the background will not take place even if a person which is the main object stands outside of the detection range of definition detecting light-receiving elements. This predetermined distance may be determined by supposing the distance to the photographer who can stand in front of the background after the self-timer has been set, and is of the order of 5 meters in practice.

For example, assuming that the limited predetermined distance is 5 m, that the main object lies at the distance of 5 m, that the light-receiving angle of the light-receiving element of the definition detecting system is 8° and that 35 mm film is used and the focal length of the phototaking lens is 40 mm, the detection range of light-receiving elements at a point as distant as 5 m from the camera is 70 cm in the lateral direction of the picture plane. In contrast, the photographing range is 4.5 m in the lateral direction and therefore, in the past, unless the main object has been within this for the detection range of 70 cm, the focus has been adjusted to the background and the main object has been out of focus.

If the present invention is used, the lens being focused to 5 m or more is limited and thus, an out-of-focus photograph is prevented from being taken. Also, when the main object to be photographed lies at a distance shorter than 5 m, the main object comes near the camera and becomes large relative to the background and therefore, the main object falls within the detection range and the automatic focus adjusting device operates with respect to the main object and obtains a good focus. When the main object lies at a distance longer than 5 m, from the nature of the depth of field that the rearward depth is greater than the forward depth, almost all of the object distances generally used during self-timer photography may be covered without problem.

Figure 2:
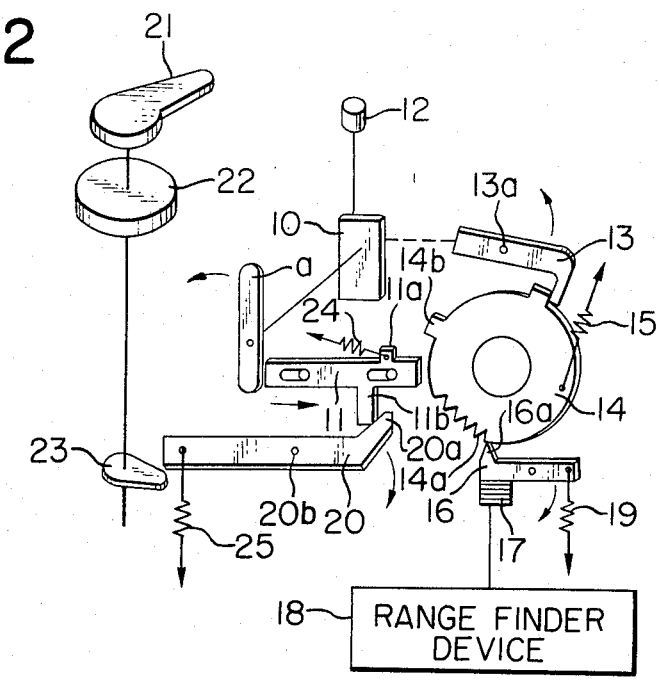
FIG. 2 is a perspective view of a mechanism portion showing a first embodiment of the present invention.

A first embodiment of the present invention will now be described with reference to FIG. 2. By counter-clockwisely rotating a self-timer operating lever 9 operably provided outside of the camera body from the position of FIG. 2 in which film and shutter have been wound up, a well-known time constant device 10 is set. By operation of a start button 12, the time constant device 10 is operated and after a predetermined time has elapsed, a lever 13 rotates counter-clockwisely about a pivot 13a to release the restraint of a drive ring 14. Then, the drive ring 14 starts to be rotated counter-clockwisely by the bias force of a spring 15 to move the phototaking lens in such a direction from the close-up distance that the lens is focused to the infinity distance. At a position whereat the phototaking lens has been focused to an object distance detected by a range finder device 18 including the definition detecting light-receiving elements, a magnet 17 is deenergized and a restraining lever 16 is pivoted clockwisely be the bias force of a spring 19, so that a pawl 16a comes into engagement with the toothed portion 14a of the drive ring 14, thus stopping the drive ring 14 and completing the focus adjustment. However, for a distance longer than a certain predetermined distance, a limit lever 11 is moved rightwardly by the lower end of the operating lever 9 against the bias force of a spring 24 and the end portion 11a of the lever 11 bears against the recess of a ring 14b and therefore, the ring 14 is not rotated any further. When the limit lever 11 is being moved rightwardly by the rotation of the operating lever 9, the right-hand edge of the end portion 11b thereof rightwardly pushes the left-hand edge of the end portion 20a of a holding lever 20 which is rotatable about a pivot 20b, thereby rotating the holding lever 20 clockwisely against the bias force of a spring 25. When the end portion 11b comes from the left side to the right side of the end portion 20a, the left-hand edge of the end portion 11b bears against the right-hand edge of the end portion 20a of the holding lever 20 which has now restored its initial position by the bias force of the spring 25.

Accordingly, even if the operating lever 9 restores its original position (the position of FIG. 2) with the aid of the time constant device 10, the holding lever 20 holds the position of the limit lever 11 against the bias force of the spring 24 and therefore, the distance restriction is not released.

Thereafter, shutter release (not shown) is effected by a well-known mechanism. A film advance lever 21, with its counter-clockwise rotation, effects the operation of a well-known shutter charge, film advance and focus adjusting ring 14 and the return device 22 of the restraining lever 16 which is a well-known mechanism, by a mechanism, not shown, and at the same time, rotates a return lever 23 counter-clockwisely. Accordingly, the holding lever 20 is pivotally moved against the force of the spring 25 and therefore, the restraint of the end portion 11b is released and the limit lever 11 returns to its initial position with the aid of the bias force of the spring 24. Thus, the distance restriction does not work until the self-timer operating lever 9 is again operated, thereby enabling normal photography to be accomplished.

The operation of the limit lever 11 may be associated with the time constant device instead of being associated with the self-timer operating lever, or alternatively it may be effected by separate exclusive operating means.

Figure 3:
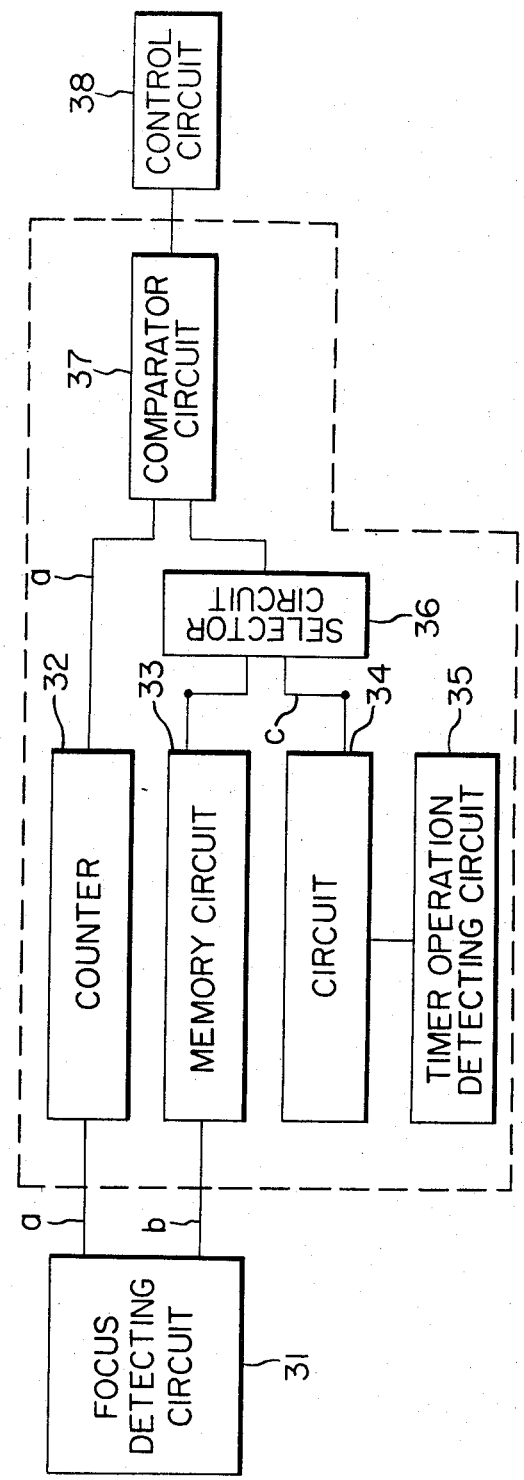
FIG. 3 is a block diagram showing a second embodiment of the present invention.

Reference is now had to FIG. 3 to describe a second embodiment of the present invention which utilizes an electrical focus detecting circuit.

A well-known focus detecting circuit 31 including a range finding circuit for detecting the object distance puts out a position signal b representing the in-focus position of the phototaking lens to be focused to the detected object distance, and such position signal b is memorized by a memory circuit 33. Thereafter, a signal a corresponding to the actual amount of movement of the lens is applied to a counter 32 in a form equivalent to said position signal. The memorized position signal b and the position signal a of the counter 32 which is the actual amount of movement of the lens are compared with each other by a comparator circuit 37 and, when the momory value and the counter value are coincident with each other, namely, when the lens has been moved to the memorized in-focus position, a signal is put out from the comparator circuit 37 to a control circuit 38 for controlling a lens restraining electromagnet and this electromagnet is driven thereby and the lens is stopped at its in-focus position.

What has been described above is the conventional focus detecting circuit and in the present embodiment, provision is further made of a timer operation detecting circuit 35 for detecting the operation of the self-timer, a circuit 34 operated by the output of the detecting circuit 35 and generating a preset signal C representing the position of the phototaking lens when focused to a predetermined object distance, and a selector circuit 36 for preparing the position signal memorized in the memory circuit 33 and said preset signal and putting out the shorter distance to a comparator circuit 37. That is, only during the operation of the self-timer, when the preset position of the arbitrarily set phototaking lens is shorter in distance than the in-focus position detected by the focus detecting circuit 31, the movement of the lens is stopped at the preset position and, when the preset position of the arbitrarily set phototaking lens is longer in distance than the in-focus position detected by the focus detecting circuit 31, the lens is stopped at the memorized in-focus position.

Figure 4:
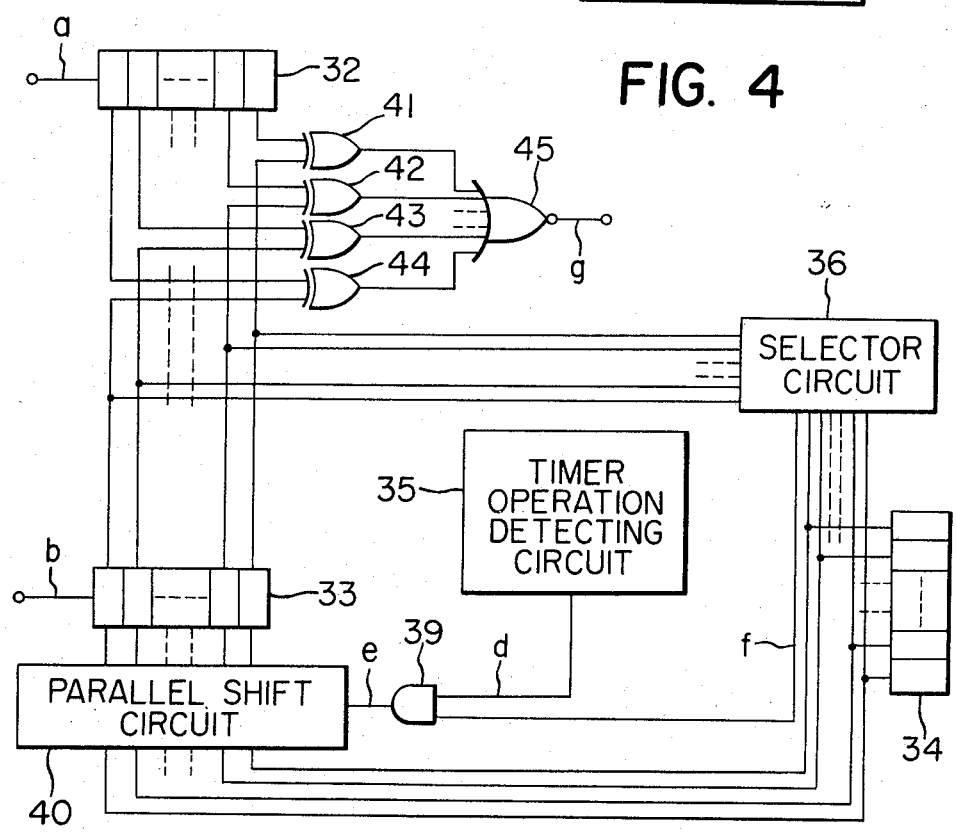
FIG. 4 is a diagram of a circuit in which the circuit of FIG. 3 has been given a concrete form.

FIG. 4 shows an embodiment in which the construction of FIG. 3 has been further given a concrete form. In FIG. 4, parts equivalent to those in FIG. 3 are given similar reference numerals. The position signal b is memorized as a digital signal by the memory counter 33. A preset signal c representing an arbitrary lens position is preset in the preset signal generating circuit 34 in a form equivalent to the memory counter 33. The position signal b (memorized in the counter 33) is compared with the preset signal c (memorized in the counter 34) by the selector circuit 36 and, when the preset signal is shorter in distance, the selector circuit 36 generates a high level output f. Conversely, when the position signal b is shorter in distance, the selector circuit 36 generates a low level output f. At this time, the timer operation detecting circuit 35 renders an output d high when the self-timer has been operated, and renders the output d low when the self-timer is not operated. Accordingly, after the position signal b has been memorized by the counter 33, the content of the counter of the preset circuit 34 is compared with the content of the counter 33 by the selector circuit 36 and, only when the output a of the lens position preset circuit 34 is shorter in distance than the position signal b (memorized in the counter 33) and the self-timer has been operated, both of the outputs f and d become high and the output e of an AND gate 39 becomes high. If a parallel shift circuit 40 is designed so as to be triggered when the output e of the AND gate is high, the content of the counter 34 in which the preset signal c is memorized will be replaced by the content of the counter 33 in which the position signal b is memorized. If the self-timer is not operated or the preset signal c is longer in distance than the position signal b, the output e of the AND gate does not change from its low level and therefore, the content of the counter 33 remains at the position signal b without being changed. Thereafter, a signal a corresponding to the actual amount of movement of the lens is applied to the counter 32 and the signal of the counter 32 is compared with the position signal of the counter 33 by well-known digital comparator circuits 41–45 and, when these two signals are coincident, the outputs g of the comparator circuits 41–45 are rendered to high level and a signal for stopping the lens is put out.

In the present invention, design may also be made such that during self-timer photography, when the in-focus position signal corresponds to a predetermined distance or greater, the warning of that fact is displayed and after the in-focus position signal has become a predetermined distance or less, the counting is started and the shutter is released.

We claim:

1. In an automatic focus adjusting device of a camera including range finder means responsive to a release operation to detect the distance to an object lying at a position corresponding to a specific area of the phototaking picture plane, and means for driving a phototaking lens so as to be focused to the distance detected by said range finder means, said camera further including timer means and being capable of effecting said release operation in response to the operation of said timer means, the improvement comprising:

limit means operable in response to said timer means to limit the amount of movement of said phototaking lens driven by said driving means so that when the distance detected by said range finder means exceeds a predetermined distance, said phototaking lens is focused to the predetermined distance.

2. An automatic focus adjusting device according to claim 1, wherein said limit means includes a limit member having a restraining portion for stopping the operation of said driving means when said phototaking lens is focused to said predetermined distance.

3. An automatic focus adjusting device according to claim 2, wherein said timer means includes a time constant device and an operating portion for setting said time constant device, and said limit member is displaceable between a restraining position in which the stoppage of said driving means by said restraining portion is possible and a position retracted from said restraining position and is moved to said restraining position in response to the setting by said operating portion.

4. An automatic focus adjusting device according to claim 3, wherein said camera further includes an operating member for winding up a shutter, and said limit means further includes means for moving said limit member to said retracted position in response to said operating member.

5. An automatic focus adjusting device according to claim 1, wherein said limit means includes selector means for comparing the distance detected by said range finder means with said predetermined distance and putting out the smaller one of said two distances to said driving means.

6. An automatic focus adjusting device according to claim 1, wherein said range finder means includes means for scanning along the optical axis of said phototaking lens from the short distance side toward infinity to detect the presence of said object, and means for detecting the distance to said object detected by said scanning means, and said limit means is provided so as to be capable of effecting said operation when said scanning means has completed the scanning from the short distance side to said predetermined distance.

* * * * *